(12) United States Patent
Liu et al.

(10) Patent No.: US 11,392,182 B2
(45) Date of Patent: Jul. 19, 2022

(54) DISPLAY PANEL AND DISPLAY DEVICE

(71) Applicant: KunShan Go-Visionox Opto-Electronics Co., Ltd., Suzhou (CN)

(72) Inventors: Quan Liu, Suzhou (CN); Huan Wang, Suzhou (CN); Lu Zhang, Suzhou (CN); Xu Qin, Suzhou (CN); Jinfang Zhang, Suzhou (CN); Siming Hu, Suzhou (CN); Zhenzhen Han, Suzhou (CN)

(73) Assignee: KunShan Go-Visionox Opto-Electronics Co., Ltd., Suzhou (CN)

( * ) Notice: Subject to any disclaimer, the term of this patent is extended or adjusted under 35 U.S.C. 154(b) by 272 days.

(21) Appl. No.: 16/922,347

(22) Filed: Jul. 7, 2020

(65) Prior Publication Data

US 2020/0333857 A1    Oct. 22, 2020

Related U.S. Application Data

(63) Continuation of application No. PCT/CN2019/099130, filed on Aug. 2, 2019.

(30) Foreign Application Priority Data

Oct. 29, 2018  (CN) .......................... 201811271576.6

(51) Int. Cl.
    *G06F 1/18*         (2006.01)
    *G09G 3/20*         (2006.01)

(52) U.S. Cl.
    CPC .............. *G06F 1/189* (2013.01); *G09G 3/20* (2013.01); *G09G 2300/0426* (2013.01); *G09G 2310/027* (2013.01)

(58) Field of Classification Search
    CPC ........................................................ H05K 5/00
    See application file for complete search history.

(56) References Cited

U.S. PATENT DOCUMENTS

| 7,710,506 B2 * | 5/2010 | Lee ................... G02F 1/136204 |
| | | 349/40 |
| 8,525,945 B2 * | 9/2013 | Kim ..................... H01L 27/0266 |
| | | 349/40 |
| 2015/0222032 A1 | 8/2015 | Goo et al. |

FOREIGN PATENT DOCUMENTS

| CN | 104122690 A | 10/2014 |
| CN | 104536229 A | 4/2015 |

(Continued)

OTHER PUBLICATIONS

International Search Report dated Nov. 6, 2019 in corresponding International Application No. PCT/CN2019/099130, 4 pages.

(Continued)

*Primary Examiner* — Jerry Wu
(74) *Attorney, Agent, or Firm* — Maier & Maier, PLLC

(57) ABSTRACT

A display panel and a display device are disclosed in the present disclosure. The display panel may include an active area and a non-active area located at a periphery of the active area. The active area may be provided with a plurality of signal lines. The non-active area may be provided with a plurality of conductive pads and a plurality of electrostatic discharge bodies. An end of each electrostatic discharge body may be connected to the active area via a corresponding signal line. The each electrostatic discharge body may be at least partially overlapped by and connected to a corresponding conductive pad.

13 Claims, 4 Drawing Sheets

(56) References Cited

FOREIGN PATENT DOCUMENTS

| | | |
|---|---|---|
| CN | 105789184 A | 7/2016 |
| CN | 205452280 U | 8/2016 |
| CN | 106324882 A | 1/2017 |
| CN | 107219660 A | 9/2017 |
| CN | 107331297 A | 11/2017 |
| CN | 109166851 A | 1/2019 |

OTHER PUBLICATIONS

First Office Action dated Feb. 19, 2020 in corresponding Chinese Application No. 201811271576.6; 13 pages.
Second Office Action dated Apr. 8, 2020 in corresponding Chinese Application No. 201811271576.6; 12 pages.

* cited by examiner

DISPLAY PANEL AND DISPLAY DEVICE

CROSS REFERENCE TO RELATED APPLICATIONS

The present application is a continuation-application of International (PCT) Patent Application No. PCT/CN2019/099130, filed on Aug. 2, 2019, which claims priorities of Chinese Patent Application No. 201811271576.6, filed on Oct. 29, 2018 in the National Intellectual Property Administration of China, the entire contents of which are hereby incorporated by reference in their entireties.

TECHNICAL FIELD

The described embodiments relate to display technology, and particularly to a display panel and a display device.

BACKGROUND

With the development of the display technology, the demands for a narrow bezel of the display panel are increasing. As a space occupied by a lower frame is compressed, a space used for arranging signal lines defined at the lower frame is getting narrower and narrower, resulting in thinner and thinner signal lines. Accordingly, the impedance of the signal lines is increased. As a result, the risk of burning of the signal lines of the display panel is also increased.

SUMMARY

A display panel and a display device are provided in the present disclosure. The problem of burning of lines due to the narrower and narrower signal lines caused by the compression of the lower frame of the display panel existed in the related art can be solved.

In order to solve the above technical problem, a technical solution adopted in the present disclosure is to provide a display panel. The display panel may include an active area and a non-active area. The non-active area can be located at a periphery of the active area. The active area may be provided with a plurality of signal lines. The non-active area may be provided with a plurality of conductive pads and a plurality of electrostatic discharge bodies. An end of each electrostatic discharge body may be connected to the active area via a corresponding signal line. The each electrostatic discharge body may be at least partially overlapped by and connected to a corresponding conductive pad.

In order to solve the above technical problem, another technical solution adopted in the present disclosure is to provide a display panel. The display panel can include a plurality of electrostatic discharge units arranged side-by-side. The display panel may define an active area and a non-active area. Each electrostatic discharge unit may include a signal line, a conductive pad and an electrostatic discharge body. A first end of the signal line can be connected to the active area. The electrostatic discharge body may be stacked together with the conductive pad. The electrostatic discharge body may be at least partially overlapped by and connected to the conductive pad. A second end of the signal line opposite to the first end can be connected to the electrostatic discharge body.

In order to solve the above technical problem, another technical solution adopted in the present disclosure is to provide a display device. The display device may include a display panel. The display panel may include an active area and a non-active area. The non-active area can be located at a periphery of the active area. The active area may be provided with a plurality of signal lines. The non-active area may be provided with a plurality of conductive pads and a plurality of electrostatic discharge bodies. An end of each electrostatic discharge body may be connected to the active area via a corresponding signal line. The each electrostatic discharge body may be at least partially overlapped by and connected to a corresponding conductive pad.

Benefit effects of the present disclosure: a display panel and a display device are provided. Each electrostatic discharge body and a corresponding conductive pad are at least partially overlapped with each other. In this way, the static electricity of the signal of the display panel can be eliminated, the capability of electrostatic protection of the display panel can be enhanced, the width of the lower frame of the display panel can be minimized while the width of signal source lines can be increased. Thereby the risk of burning of signal lines of the display panel can be reduced and the production yield of the display panel can be improved.

DETAILED DESCRIPTION

In order to make the purpose, technical solutions and effects of the present disclosure more clear and unambiguous, the present disclosure will be described below in detail with reference to the drawings and embodiments.

Figure 1:
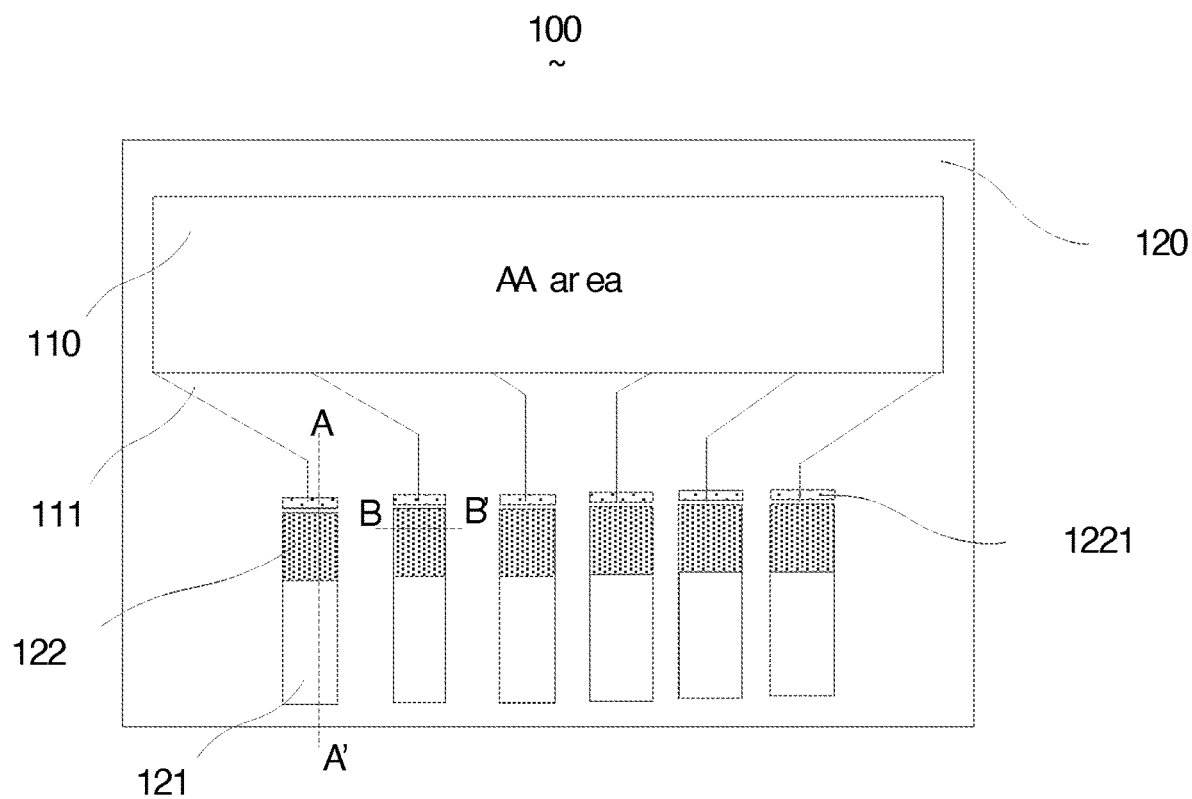
FIG. 1 is a structural schematic view of a display panel according to an embodiment of the present disclosure.

FIG. 1 is a structural schematic view of a display panel according to an embodiment of the present disclosure. As shown in FIG. 1, the display panel 100 provided in the present disclosure may include an active area 110 ("AA area" for short) and a non-active area 120 located at a periphery of the active area 110. Alternatively, the non-active area 120 may not be necessarily disposed around an entire periphery of the active area 110. Specifically, the non-active area 120 may be arranged only at a periphery of one side edge, or a periphery of two side edges, or a periphery of both two side edges and a bottom edge, or only at a periphery of the bottom edge of the active area 110.

The active area 110 may be provided with a plurality of signal lines 111. Optionally, the plurality of signal lines 111 may include at least one of gate line, data line, gate scanning line, and data scanning line which is not limited by the present disclosure.

The non-active area 120 may be provided with a plurality of conductive pads 121 and a plurality of electrostatic discharge bodies 122. Each conductive pad 121 and a corresponding electrostatic discharge body 122 are stacked together. The each conductive pad 121 may be a test pad and indirectly connected to a corresponding signal line 111. Specifically, an end of each electrostatic discharge body 122 may be connected to the active area 110 via a corresponding signal line 111. The each electrostatic discharge body 122 may be at least partially overlapped by and electrically connected to a corresponding conductive pad 121.

Figure 2:
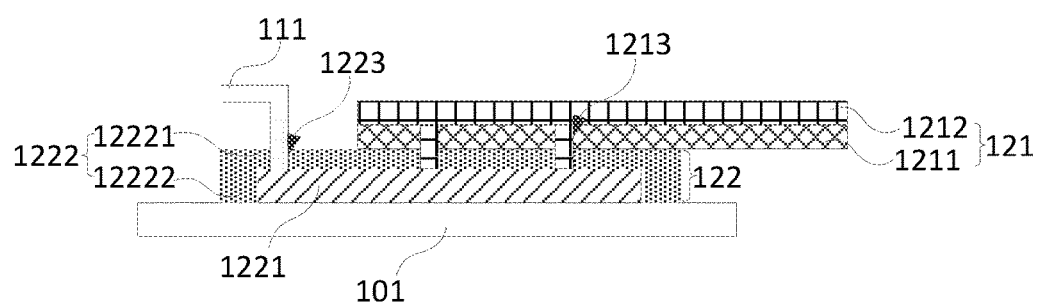
FIG. 2 is a schematic cross-sectional view on the section A-A' in FIG. 1 of the present disclosure.
Figure 3:
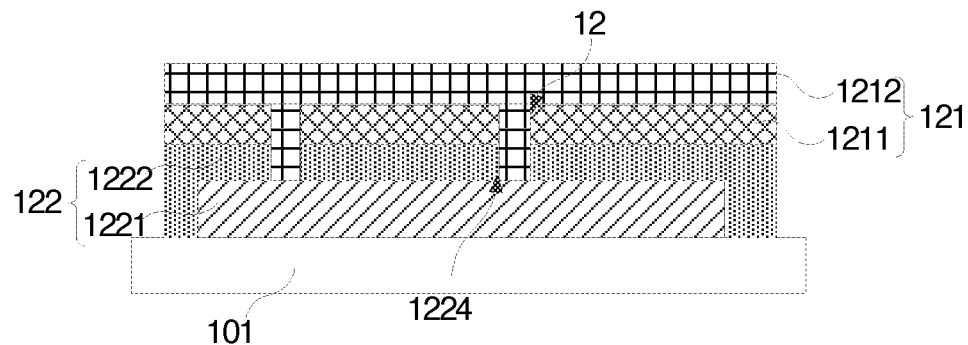
FIG. 3 is a schematic cross-sectional view on the section B-B' in FIG. 1 of the present disclosure.

FIG. 2 is a schematic cross-sectional view on the section A-A' in FIG. 1 of the present disclosure. FIG. 3 is a schematic cross-sectional view on the section B-B' in FIG. 1 of the present disclosure. Specifically, FIG. 2 is a schematic cross-sectional view of the display panel along a direction parallel to a long side of a conductive pad 121 in FIG. 1. FIG. 3 is a schematic cross-sectional view of the display panel along a direction parallel to a short side of a conductive pad 121 in FIG. 1. As shown in FIGS. 2 and 3, the display panel 100 may further include a base substrate 101. The each electrostatic discharge body 122 in the present disclosure can be disposed between the base substrate 101 and the corresponding conductive pad 121 and partially overlapped by the corresponding conductive pad 121.

Alternatively, the each electrostatic discharge body 122 may include a main body 1221 and a first insulating layer 1222 covering the main body 1221. Specifically, the main body 1221 may be arranged on the base substrate 101. A plurality of faces of the main body 1221 without being contacted with the base substrate 101 may be covered by the first insulating layer 1222 such that the main body 1221 can be accommodated in a space cooperatively defined by the base substrate 101 and the first insulating layer 1222. The first insulating layer 1222 may be partially overlapped by the corresponding conductive pad 121. A portion of the first insulating layer 1222 without being overlapped by the corresponding conductive pad 121 may define a first via 1223. Specifically, the first insulating layer 1222 may include a first portion 12221 arranged at a side of the main body 1221 away from the base substrate 101. The first via 1223 can be defined in the first portion 12221. FIG. 2 illustrates a corresponding signal line 111 can be electrically connected to a main body 1221 of a corresponding electrostatic discharge body 122 through the first via 1223.

Optionally, a material of the main body 1221 of the each electrostatic discharge body 122 may be a semiconductor material, such as amorphous silicon or polycrystalline silicon, and is not specifically limited herein. With the use of the semiconductor material, the capacity of charge carrying and the acceptance of electrostatic discharge of the each electrostatic discharge body 122 can be improved, such that the each electrostatic discharge body 122 can receive and carry more charge from electrostatic discharge.

The arrangement of the each electrostatic discharge body 122 between the corresponding conductive pad 121 and the base substrate 101 is beneficial to discharge the static electricity generated by the corresponding signal line 111 (a test signal line in this embodiment) in the display panel 100 to protect the display panel 100 against static electricity.

Furthermore, in a specific embodiment, a width of the each electrostatic discharge body 122 (may be a width of a vertical projection of the main body 1221 and the first insulating layer 1222) may be smaller than or equal to a width of the corresponding conductive pad 121. A length of the each electrostatic discharge body 122 can be smaller than or equal to a length of the corresponding conductive pad 121. In practical applications, a dimensional relationship between the each electrostatic discharge body 122 and the corresponding conductive pad 121 can be determined according to the actual situation and is not specifically limited here. In the present embodiment, the width of the each electrostatic discharge body 122 is equal to the width of the corresponding conductive pad 121. The length of the each electrostatic discharge body 122 is smaller than the length of the corresponding conductive pad 121. An aspect ratio of the each electrostatic discharge body 122 may be 2:1. An area of a portion of the each electrostatic discharge body 122 overlapped by the corresponding conductive pad 121 is smaller than an area of a vertical projection of the each electrostatic discharge body 122 on the base substrate 101 of the display panel 100.

With reference to FIGS. 1 to 3, the each conductive pad 121 can include a second insulating layer 1211 and a first metal layer 1212 sequentially stacked together along a direction away from the base substrate 101. Specifically, the first insulating layer 1222 of the each electrostatic discharge body 122 may be partially overlapped by a corresponding second insulating layer 1211. A portion of the first insulating layer 1222 overlapped by the corresponding second insulating layer 1211 can define at least one second via 1224. The second insulating layer 1211 may define at least one third via 1213 in a one-to-one correspondence to the at least one second via 1224. The main body 1221 of the each electrostatic discharge body 122 may be electrically connected to a corresponding first metal layer 1212 through the at least one second via 1224 and the at least one third via 1213. A film structure of the each conductive pad 121 (test pad) in the present embodiment may be consisted of the second insulating layer 1211 and the first metal layer 1212, so as not to affect the test of the active area 110 of the display panel 100.

Understandably, in a specific application, after a test driving signal is input to a conductive pad 121 by a driving IC, the test driving signal is transmitted to a main body 1221 of a corresponding electrostatic discharge body 122 sequentially passing through a corresponding first metal layer 1212, at least one third via 1213 defined in a corresponding second insulating layer 1211 and at least one second via 1224 defined in a corresponding first insulating layer 1222. After being electrostatically eliminated by the main body 1221 of the corresponding electrostatic discharge body 122, the test driving signal is transmitted to the active area 110 of the display panel 100 through a corresponding signal line 111 connected to a first via 1223 defined in the corresponding first insulating layer 1222. In this way, the electrostatic protection capability of the display panel 100 can be improved such that test signal lines of the display panel 100 can be protected from being burnt.

In this embodiment, the inventor of the present disclosure found that when the aspect ratio of the each electrostatic discharge body 122 is 2:1, the electrostatic discharge body 122 may have a stronger capability to remove static electricity generated by the test signal lines in the display panel 100, and its electrostatic protection capability can be stronger.

Figure 4:
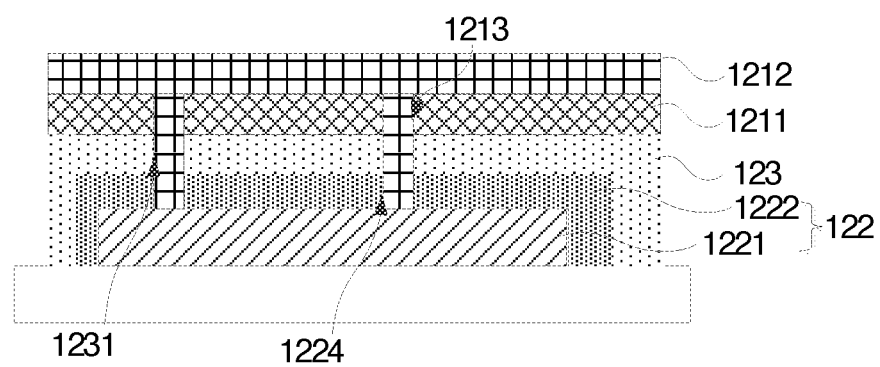
FIG. 4 is a schematic cross-sectional view of a display panel in a direction along a short side of a conductive pad according to an embodiment of the present disclosure when a corresponding electrostatic discharge body and the conductive pad are overlapped with each other.
Figure 5:
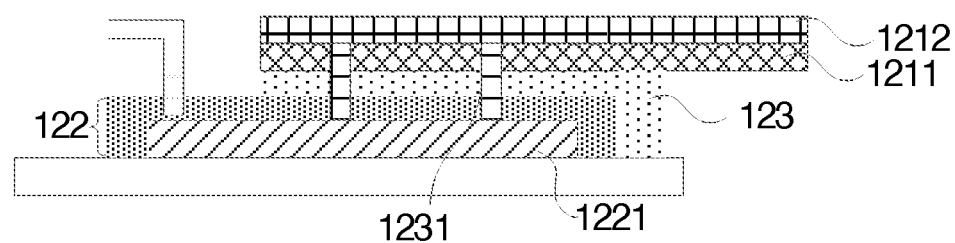
FIG. 5 is a schematic cross-sectional view of a display panel in a direction along a long side of a conductive pad according to an embodiment of the present disclosure when a corresponding electrostatic discharge body and the conductive pad are overlapped with each other.

In addition, referring to FIGS. 4 and 5, in the present embodiment, the display panel may further include a plurality of second metal layers 123. Each second metal layer 123 may be sandwiched between a corresponding first insulating layer 1222 and a corresponding second insulating layer 1211. The each second metal layer 123 may define a at least one fourth via 1231 in a one-to-one correspondence to the at least one second via 1224 and/or the at least one third via 1213. The main body 1221 can be electrically connected to a corresponding first metal layer 1212 through a corresponding plurality of second vias 1224, a corresponding plurality of fourth vias 1231 and a corresponding plurality of third vias 1213 in sequence.

Understandably, in the above embodiment, a side of the main body 1221 of the each electrostatic discharge body 122 close to the active area 110 can be convex relative to a side of a corresponding conductive pad 121 close to the active area 110. That is, a first distance between the side of the main body 1221 close to the active area 110 and the active area 110 is smaller than a second distance between the side of the corresponding conductive pad 121 close to the active area 110 and the active area 110. In other embodiments, the side of the main body 1221 of the each electrostatic discharge body 122 close to the active area 110 may be flushed with the side of the corresponding conductive pad 121 close to the active area. That is, the first distance is equal to the second distance. However, the each electrostatic discharge body 122 cannot be completely covered by the corresponding conductive pad 121 (That is, the first distance should not be larger than the second distance) because:

Combing with FIGS. 2-5, it is assumed that the each electrostatic discharge body 122 is completely overlapped by the corresponding conductive pad 121. That is, the side of the main body 1221 of the each electrostatic discharge body 122 close to the active area 110 is completely covered by the corresponding conductive pad 121. As a result, the first portion 12221 of the first insulating layer 1222 of the each electrostatic discharge body 122 is completely covered by the second insulating layer 1211 of the corresponding conductive pad 121. Thereby the first portion 12221 of the first insulating layer 1222 cannot be configured to define a first via 1223 for connecting a corresponding signal line 111. As a result, when a test driving signal is transmitted from the driving IC to a conductive pad 121, static electricity of the test driving signal cannot be eliminated by the electrostatic discharge body 122.

Accordingly, the side of the each electrostatic discharge body 122 close to the active area 110 should be convex relative to the side of the corresponding conductive pad 121 close to the active area 110. Otherwise, it may be difficult for the each electrostatic discharge body 122 to function to eliminate the static electricity of the display panel 100.

In addition, the inventor also found that, in the non-active area 120 of the display panel 100, when the each electrostatic discharge body 122 is completely overlapped by the corresponding conductive pad 121 (that is, the side of the main body 1221 of the each electrostatic discharge body 122 close to the active area 110 is flushed with the side of the corresponding conductive pad 121 close to the active area 110), the display panel 100 has a function of eliminating static electricity of the signal, the capability of electrostatic protection of the display panel 100 can be improved, and the width of the lower frame of the display panel 100 can be minimized, thus the saved space can be allocated to increase the width of signal lines 111, thereby preventing the signal lines 111 from being burnt to not to adversely affect the display panel 100.

The inventor also found that, when the side of the main body 1221 of the each electrostatic discharge body 122 close to the active area 110 is flushed with the side of the corresponding conductive pad 121 close to the active area 110, a length of the conductive pad 121 need not be compressed, thereby the needs of process production can be satisfied.

In other embodiments, the each electrostatic discharge body 122 can also be connected to other signal lines that easily generate static electricity, such as signal lines of multiplexed signal, signal lines of demultiplexer (Demux for short), signal lines of start signal of a scan circuit and signal lines of enable signal. Related principle of electrostatic discharge is the same to the principle in the above embodiment. Specifically, the each electrostatic discharge body 122 is at least partially overlapped by the corresponding conductive pad 121 to play a role in electrostatic protection of the signal lines 111 in the display panel 100 to prevent the signal lines 111 from being burnt, thereby improving the electrostatic protection capability of the display panel 100.

In the above embodiments, the each electrostatic discharge body 122 and the corresponding conductive pad 121 are at least partially overlapped with each other. In this way, the static electricity of the signal of the display panel 100 can be eliminated, the capability of electrostatic protection of the display panel 100 can be enhanced, the width of the lower frame of the display panel 100 can be minimized, and the width of signal lines 111 can be increased. Thereby the risk of burning of signal lines 111 of the display panel 100 can be reduced and the production yield of the display panel 100 can be improved.

Figure 6:
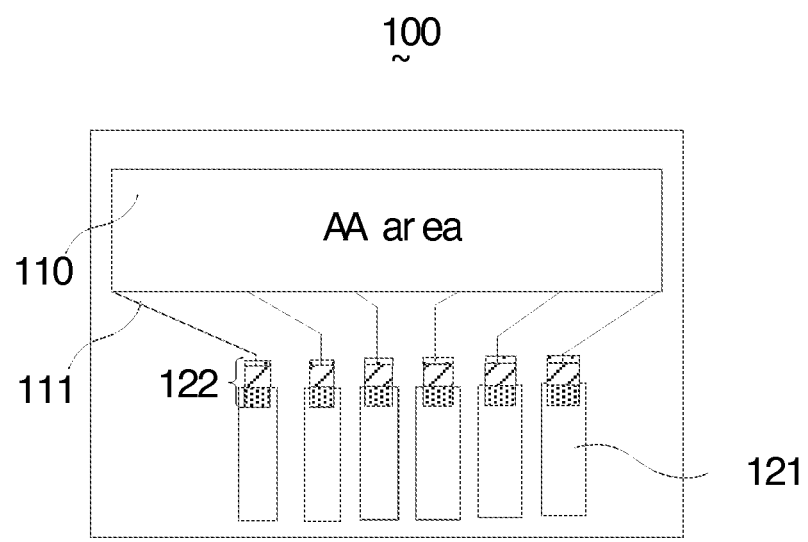
FIG. 6 is a structural schematic view of a display panel according to an embodiment of the present disclosure.

FIG. 6 is a structural schematic view of a display panel according to an embodiment of the present disclosure. As shown in FIG. 6, the display panel 100 in this embodiment is substantially the same as that of the embodiment described above. The display panel 100 in this embodiment is different from that in the embodiment described above in that: in this embodiment, an area of a portion of each electrostatic discharge body 122 overlapped by a corresponding conductive pad 121 is smaller than an area of a vertical projection of the each electrostatic discharge body 122 on the base substrate 101, and a width of the each electrostatic discharge body 122 is smaller than a width of the corresponding conductive pad 121. Similarities of the display panel 100 between this embodiment and the embodiment described above are not repeated in detail here, and are roughly described as follows:

As shown in FIG. 6, the display panel 100 provided in the present disclosure may include an active area 110 and a non-active area 120 located at a periphery of the active area 110. Alternatively, the non-active area 120 may not be necessarily disposed around an entire periphery of the active area 110. The non-active area 120 may be arranged only at a periphery of one side edge, or a periphery of two side edges, or a periphery of both two side edges and a bottom edge, or only at a periphery of the bottom edge of the active area 110.

The active area 110 may be provided with a plurality of signal lines 111. Optionally, the plurality of signal lines 111 may include at least one of gate line, data line, gate scanning line, data scanning line which is not limited by the present disclosure.

The non-active area 120 may be provided with a plurality of conductive pads 121 and a plurality of electrostatic discharge bodies 122. Each conductive pad 121 and a corresponding electrostatic discharge body 122 are stacked together. The each conductive pad 121 may be a test pad or other conductive pad, which is not limited here.

An end of each electrostatic discharge body 122 may be connected to the active area 110 via a corresponding signal line 111. The each electrostatic discharge body 122 may be at least partially overlapped by and electrically connected to a corresponding conductive pad 121. In the present embodiment, a width of the each electrostatic discharge body 122 may be smaller than a width of the corresponding conductive pad 121. An area of a portion of the each electrostatic discharge body 122 overlapped by a corresponding conductive pad 121 is a half of an area of a vertical projection of the each electrostatic discharge body 122 on the base substrate 101 or other, which is not limited here. Understandably, except for the area of an overlapping portion described above, both material and a film structure of the each electrostatic discharge body 122 in the present embodiment are similar to those in the embodiment described above. Related details can be found in the specific description in the embodiment described above, which will not be repeated here.

Figure 7:
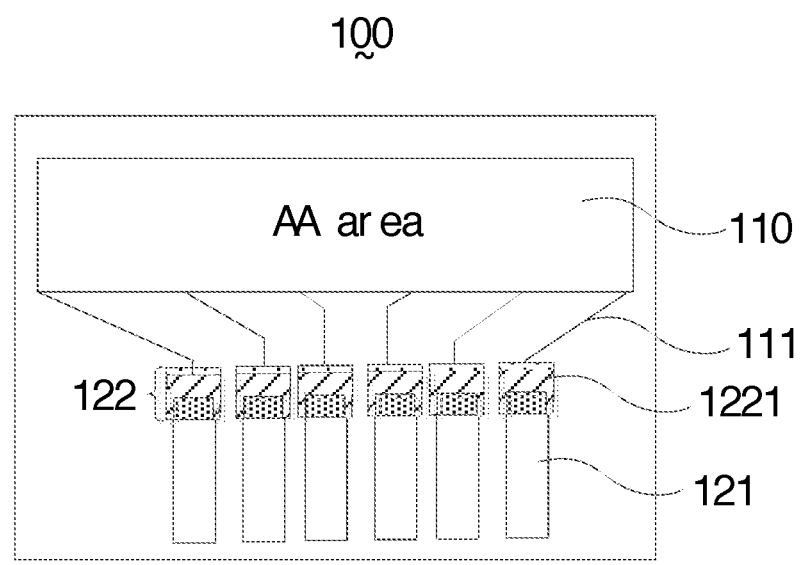
FIG. 7 is a structural schematic view of a display panel according to an embodiment of the present disclosure.

Furthermore, in another embodiment of the present disclosure, referring to FIG. 7, a width of each electrostatic discharge body 122 may be larger than a width of a corresponding conductive pad 121. Understandably, as long as a side of the main body 1221 of the each electrostatic discharge body 122 close to the active area 110 is convex relative to a side of the corresponding conductive pad 121 close to the active area 110, the static electricity of the display panel 100 can be eliminated, and the capability of electrostatic protection of the display panel 100 can be enhanced.

In the above embodiments, the each electrostatic discharge body 122 and the corresponding conductive pad 121 are at least partially overlapped with each other. In this way, the static electricity of the display panel 100 can be eliminated, the capability of electrostatic protection of the display panel 100 can be enhanced, the width of the lower frame of the display panel 100 can be minimized, and the width of signal lines 111 can be increased. Thereby the risk of burning of signal lines 111 of the display panel 100 can be reduced and the production yield of the display panel 100 can be improved.

Figure 8:
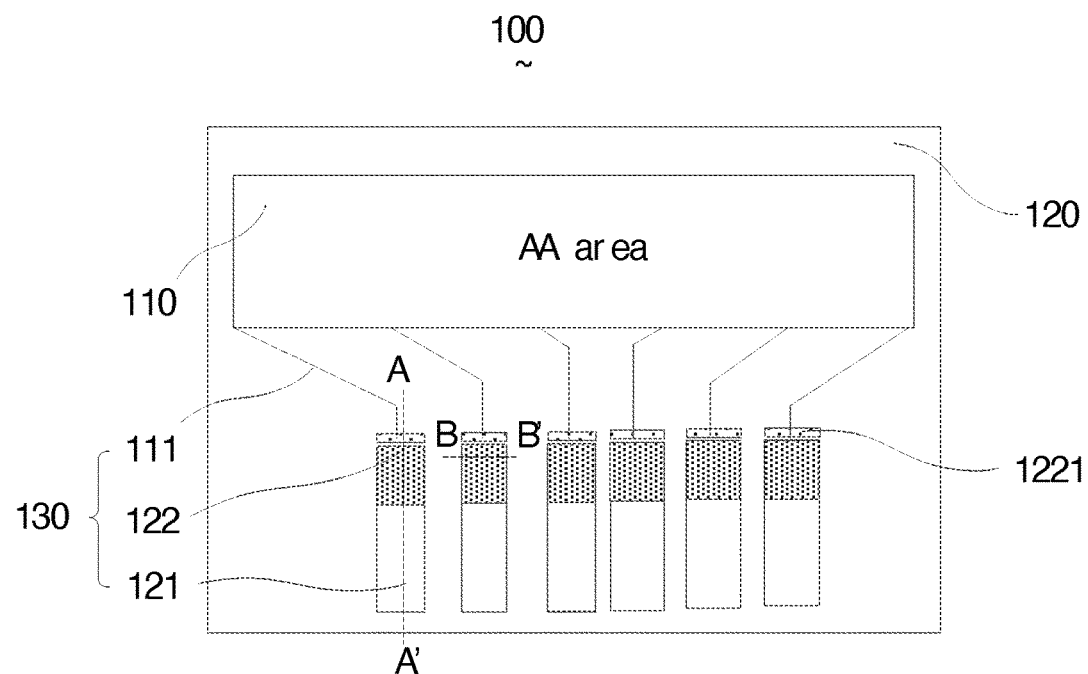
FIG. 8 is a structural schematic view of a display panel according to an embodiment of the present disclosure.

Referring to FIG. 8, a display panel according to an embodiment of the present disclosure may include a plurality of electrostatic discharge units 130 arranged side-by-side. The display panel 100 may define an active area 110 and a non-active area 120. Each electrostatic discharge unit 130 may include a signal line 111, a conductive pad 121 and an electrostatic discharge body 122. A first end of the signal line 111 can be connected to the active area 110. The electrostatic discharge body 122 may be stacked together with the conductive pad 121. The electrostatic discharge body 122 may be at least partially overlapped by and connected to the conductive pad 121. A second end of the signal line 111 opposite to the first end can be connected to the electrostatic discharge body 122.

Specifically, a width of the electrostatic discharge body 122 can be equal to a width of the conductive pad 121.

Figure 9:
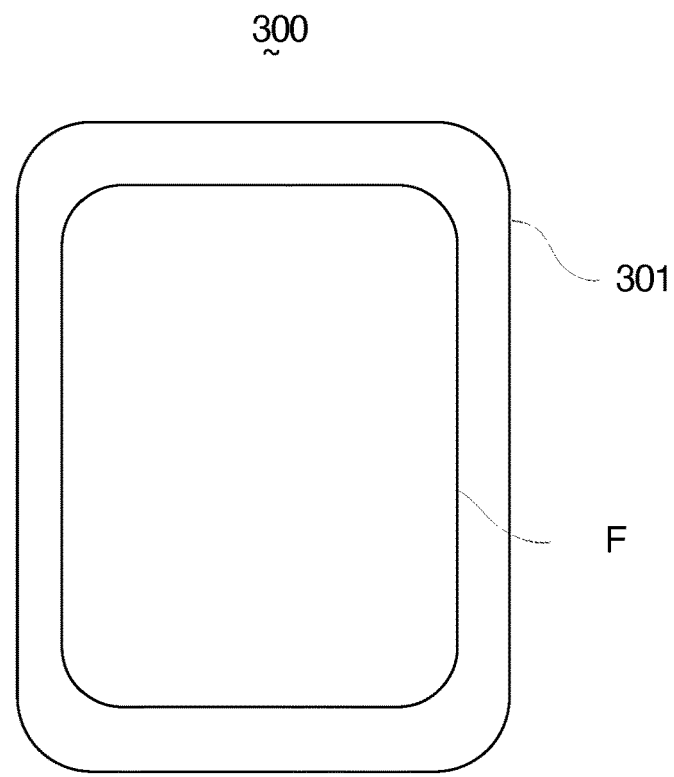
FIG. 9 is a structural schematic view of a display device according to an embodiment of the present disclosure.

FIG. 9 is a structural schematic view of a display panel according to an embodiment of the present disclosure. As shown in FIG. 9, the display device 300 may include a housing 301 and a display panel F. The display panel F of the display device 300 in the present disclosure may be the display panel described in any of the above embodiments of the present disclosure. Specific structure of the display panel F is described above, and will not be repeated here.

The display device 300 provided in the present disclosure may be any product or component with a display function, such as a mobile phone, a tablet computer, a television, a display, a notebook computer, a digital photo frame, a smart wearable display device and a navigator.

In summary, a display panel and a display device are provided in the present disclosure. Each electrostatic discharge body and a corresponding conductive pad can be at least partially overlapped with each other. In this way, the static electricity of the signal of the display panel can be eliminated, the capability of electrostatic protection of the display panel can be enhanced, the width of the lower frame of the display panel can be minimized, and the width of signal lines can be increased. Thereby the risk of burning of signal lines of the display panel can be reduced and the production yield of the display panel can be improved.

The above description is only some embodiments of the present disclosure, and it is not intended to limit the protection scope of the present disclosure. Any equivalent structure or equivalent process transformation made according to the contents of the specification and drawings of this disclosure, or a direct or indirect application of the above scheme in other related technical fields, are all considered to be included in the scope of patent protection of this disclosure.

What is claimed is:

1. A display panel, comprising: an active area, provided with a plurality of signal lines; and a non-active area, located at a periphery of the active area and provided with a plurality of conductive pads and a plurality of electrostatic discharge bodies; wherein an end of each electrostatic discharge body is connected to the active area via a corresponding signal line, the each electrostatic discharge body is at least partially overlapped by and connected to a corresponding conductive pad; and a base substrate, wherein the each electrostatic discharge body is disposed between the base substrate and the corresponding conductive pad and partially overlapped by the corresponding conductive pad; and the each electrostatic discharge body comprises a main body and a first insulating layer covering the main body, the first insulating layer is partially overlapped by the corresponding conductive pad, a portion of the first insulating layer without being overlapped by the corresponding conductive pad defines a first via, a corresponding signal line is electrically connected to a main body of a corresponding electrostatic discharge body through the first via; and each conductive pad comprises a second insulating layer and a first metal layer sequentially stacked together along a direction away from the base substrate, the first insulating layer is partially overlapped by a corresponding second insulating layer; and a portion of the first insulating layer overlapped with the corresponding second insulating layer defines at least one second via, the second insulating layer defines at least one third via in a one-to-one correspondence to the at least one second via, the main body of the each electrostatic discharge body is electrically connected to a corresponding first metal layer through the at least one second via and the at least one third via.

2. The display panel according to claim 1, wherein a side of the main body close to the active area is convex relative to or flushed with a side of the corresponding conductive pad close to the active area.

3. The display panel according to claim 2, wherein a first distance between the side of the main body close to the active area and the active area is smaller than or equal to a second distance between the side of the corresponding conductive pad close to the active area and the active area.

4. The display panel according to claim 1, further comprising a plurality of second metal layers, wherein each second metal layer is sandwiched between a corresponding first insulating layer and a corresponding second insulating layer, the each second metal layer defines at least one fourth via in a one-to-one correspondence to the at least one second via or the at least one third via, the main body is electrically connected to a corresponding first metal layer through a corresponding plurality of second vias, a corresponding plurality of fourth vias and a corresponding plurality of third vias in sequence.

5. The display panel according to claim 1, wherein the main body is arranged on the base substrate, a plurality of faces of the main body without being contacted with the base substrate is covered by the first insulating layer to make that the main body is accommodated in a space cooperatively defined by the base substrate and the first insulating layer.

6. The display panel according to claim 1, wherein the first insulating layer comprises a connecting portion arranged at a side of the main body away from the base substrate, the first via is defined in the connecting portion.

7. The display panel according to claim 1, wherein an area of a portion of the each electrostatic discharge body overlapped by the corresponding conductive pad is smaller than or equal to an area of a vertical projection of the each electrostatic discharge body on the base substrate.

8. The display panel according to claim 1, wherein a width of the each electrostatic discharge body is smaller than or equal to or larger than a width of the corresponding conductive pad.

9. The display panel according to claim 8, wherein the each electrostatic discharge body comprises a main body and a first insulating layer covering the main body, the width of the each electrostatic discharge body is a width of a vertical projection of the main body and the first insulating layer on the base substrate.

10. The display panel according to claim 1, wherein a length of the each electrostatic discharge body is smaller than or equal to a length of the corresponding conductive pad.

11. The display panel according to claim 1, wherein an aspect ratio of the each electrostatic discharge body is 2:1.

12. The display panel according to claim 1, wherein the plurality of signal lines comprise at least one of gate line, data line, gate scanning line and data scanning line.

13. The display panel according to claim 1, wherein the each electrostatic discharge body comprises a main body and a first insulating layer covering the main body, a material of the main body is a semiconductor material.

* * * * *